July 19, 1932.   W. MACKIE   1,868,213

MANUFACTURE OF SHAPED METAL ARTICLES

Filed Dec. 18, 1931

INVENTOR
Wᴹ MACKIE
By Fetherstonhaugh & Tansley
Attys

Patented July 19, 1932

1,868,213

UNITED STATES PATENT OFFICE

WILLIAM MACKIE, OF GLASGOW, SCOTLAND

MANUFACTURE OF SHAPED METAL ARTICLES

Application filed December 18, 1931, Serial No. 581,984, and in Great Britain June 17, 1931.

This invention relates to apparatus for the production by flame-cutting of shaped metallic articles, being primarily devised for the production from metallic angle-bar stock of chain-link blanks each including a link-forming portion and a flange or lug portion extending at an angle to the link-forming portion.

According to the invention, there is provided for reception of the stock a rotary carrier which during the flame-cutting operation is partially rotated successively in reverse directions whereby faces of the stock in different planes are presented in turn to the cutting flame. The torch is traversed by mechanism well known in the metal-cutting art in the direction of the stock and transverse thereto in accordance with the configuration of the article to be produced. A switch device coming into action in the travel of the nozzle controls the operation of a reversible electric motor geared to the stock-carrier.

Figure 1:
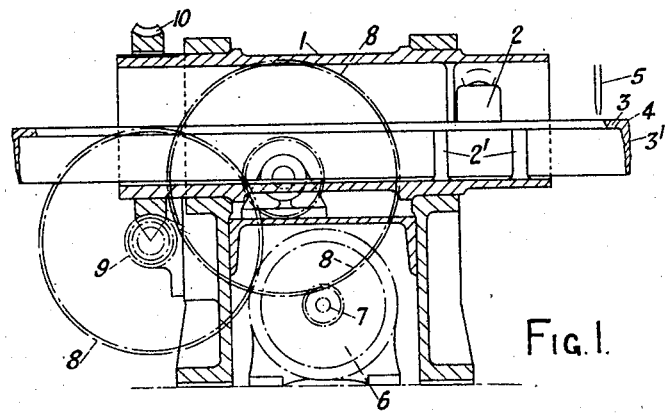
Figure 2:
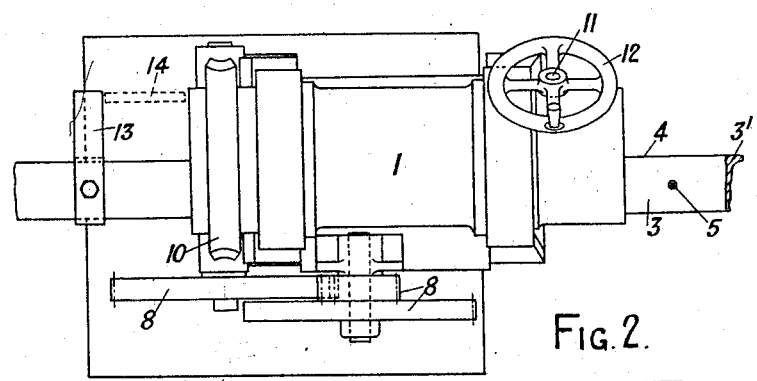
Figure 6:
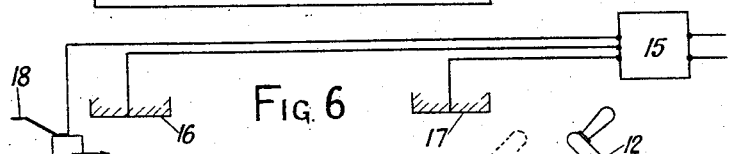
Figure 4:
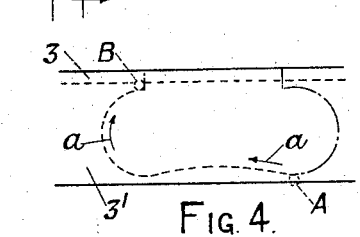
Figure 5:
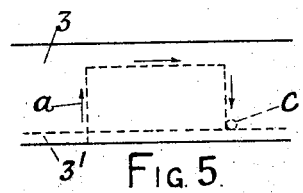
Figure 3:
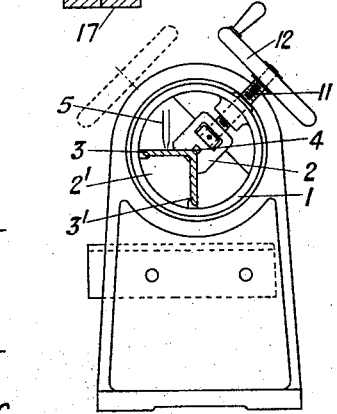

Apparatus according to the invention is illustrated in Figs. 1–3 of the accompanying drawing, Fig. 1 being a longitudinal vertical section, Fig. 2 a plan view and Fig. 3 an elevation at right angles to Fig. 1; Figs. 4 and 5 are fragmentary plan views illustrative of the cutting process; Fig. 6 is a circuit diagram.

Referring particularly to Figs. 1–3, 1 denotes a hollow rotary cylinder provided internally, adjacent to one end, with a clamping jaw 2 for clamping a metallic angle-bar comprising flanges 3, 3' at right angles to each other, so that the longitudinal corner edge 4 of the bar is coincident with the axis of the cylinder 1. Part of the bar projecting beyond that end of the cylinder adjacent to the jaw 2 is acted upon by a cutting flame which issues from a torch 5 and which cuts the chain-link blanks from the bar, the bar being fed through the cylinder 1 towards the flame as each chain-link blank is completed. The torch 5 remains uniformly spaced from the horizontal plane containing the corner edge 4 of the bar but is traversed horizontally in the direction lengthwise of the bar and transverse thereto by mechanism well known in the art under the control of a template.

For rotating the cylinder 1 there is employed a reversible electric motor indicated at 6, the armature shaft 7 of which motor is geared to the cylinder 1 through a train of spur-and-pinion speed-reduction gearing indicated generally at 8 and terminating in a worm 9 meshing with a wormwheel 10 fixed to the cylinder 1.

The clamping jaw 2 is carried by a screw 11 extending radially of the cylinder and engaging a screw-threaded aperture in the lateral wall thereof, the screw 11 being provided externally of the cylinder with a handwheel 12 operable to effect the clamping and unclamping of the bar. Co-operating with the jaw 2 are abutment members 2' integral with the cylinder and engageable with the bosom of the bar.

In the cutting operation, while the bar is maintained in the position shown in Fig. 4, i. e., with the flange 3' in horizontal position, the flame, starting at the point A (Fig. 4) and moving in a horizontal plane in the direction indicated by the arrows $a$ along the path indicated in dotted lines, partially cuts the chain-link portion proper from the flange 3'. When the flame reaches the point B, the cylinder is rotated slowly through a right angle so that the flame cuts the corner metal as the flange 3 is brought into the horizontal position shown in Figs. 1–4 for cutting the lug whose outline is shown in dotted lines in Fig. 5. When the flame reaches the point C (Fig. 5), the cylinder is rotated reversely through a right angle to initial position so as again to cut the corner metal and so as to permit the flame to complete the cutting of the blank, i. e., to return to the point A (Fig. 4) along the path indicated in chain-dotted lines in this figure.

The motor 6 is automatically controlled by a forward and reverse contactor 15 (Fig. 6) in circuit with switch devices including stationary contacts 16, 17 adapted to be traversed by a spring brush contact 18 also in circuit with the contactor 15 and moving with the nozzle 5. The arrangement is such that, when the cutting flame reaches the point B, the contact 18 engages the contact 16 for a predetermined period of time during which the cylinder 1 is rotated through a right angle, and, when the cutting flame reaches the point C, the contact 18 engages the contact 17 for a predetermined period of time during which the cylinder 1 is rotated reversely through the same angle.

As will be understood, the speed of rotation of the cylinder is chosen to suit the cutting speed of the flame which latter speed depends on the weight of the stock being cut.

In the construction illustrated, the bar is fed manually through the cylinder, being provided with a shiftable grab or clamp 13 spaced from the rear end of the cylinder a distance slightly in excess of the overall length of the blank to be cut and gauged by a portable distance piece 14 adapted to be interposed momentarily between the clamp 13 and the rear end of the cylinder 1. The bar is fed forwardly after each cutting operation until the grab or clamp 13 abuts on the rear end of the cylinder. After the bar is clamped in cutting position, the grab or clamp 13 is slackened on the bar and retracted to gauge position thereon ready for a subsequent feeding movement.

I claim:—

1. Apparatus for the production of shaped metallic articles from stock by flame-cutting comprising a rotary stock-carrier, means on said carrier for clamping the stock within said carrier, with part of the stock projecting beyond one end of said carrier, a torch movable over said projecting part of the stock, a reversible motor geared to said carrier, and switch means operable in given positions of said torch for controlling the diretion of rotation of said motor.

2. Apparatus for the production of shaped metallic bars of angle section, comprising a rotatable cylinder, means for clamping a bar of angle section in said cylinder with its corner edge coincident with said axis, and with part of said bar projecting from said cylinder, a torch movable in a plane parallel to said axis over said projecting part of said bar in the direction of said axis and transverse thereto, a reversible motor geared to said cylinder, and switch means operative in given positions of said torch for controlling the supply of current to said motor.

In testimony whereof I have signed my name to this specification.

WM. MACKIE.